UNITED STATES PATENT OFFICE.

ROBERT E. SCHMIDT, OF ELBERFELD, GERMANY, ASSIGNOR TO THE FARBEN-FABRIKEN OF ELBERFELD COMPANY, OF NEW YORK, N. Y.

GREEN DYE DERIVED FROM ANTHRAQUINONE.

SPECIFICATION forming part of Letters Patent No. 599,426, dated February 22, 1898.

Application filed October 4, 1897. Serial No. 653,923. (No specimens.) Patented in Germany October 14, 1894, No. 84,509; in France December 3, 1894, No. 243,316; in England December 8, 1894, No. 23,927, and in Italy December 31, 1894, XXIX, 37,890, and LXXIV, 206.

*To all whom it may concern:*

Be it known that I, ROBERT E. SCHMIDT, chemist, doctor of philosophy, residing at Elberfeld, Germany, (assignor to the FARBENFABRIKEN OF ELBERFELD COMPANY, of New York,) have invented a new and useful Improvement in the Manufacture of Green Anthraquinone Dye, (for which the Farbenfabriken, vormals Fr. Bayer & Co., of Elberfeld, Germany, has already obtained Letters Patent in Germany, No. 84,509, dated October 14, 1894; in England, No. 23,927, dated December 8, 1894; in France, No. 243,316, dated December 3, 1894, and in Italy, Reg. Gen., Vol. 29, No. 37,890, Reg. Att., Vol. 74, No. 206, dated December 31, 1894;) and I do hereby declare the following to be an exact and clear description of my invention.

My invention relates to the production of a new class of anthraquinone dyestuffs, being probably monosulfo-acids of the condensation products from one molecule of quinizarin and two molecules of primary aromatic amins, which condensation products have the general formula

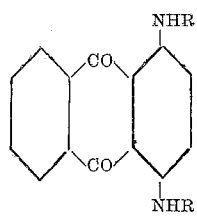

(R representing in this formula an aromatic radical, such as phenyl, tolyl, xylyl, naphthyl, or the like.)

My new process in general terms consists in introducing one sulfo group into the above-defined condensation products—for instance, by means of sulfuric monohydrate. The sulfo-acids thus obtained are very valuable coloring-matters, dyeing unmordanted wool in acid-baths from bluish-green to yellowish-green shades, which are fast to light, acids, and alkalies. In dry state the new coloring-matters are dark powders soluble in water with a green color, which color is not changed by the addition of alkalies.

In carrying out my new process practically I can proceed as follows: A mixture prepared from ten kilos, by weight, of quinizarin and two hundred kilos, by weight, of paratoluidin, and ten kilos, by weight, of crystallized boric acid is heated at from 130° to 140° centigrade with continuous stirring. The original brownish-red color of the reaction mixture gradually turns into bluish green during this operation. The reaction is finished as soon as the intensity of the green color of the mixture no longer increases. The liquid, previously cooled to about 60° centigrade, is then poured into a mixture prepared from four hundred kilos, by weight, of hydrochloric acid (15° Baumé) and sixteen hundred liters of water. The blackish-green precipitate thus obtained represents the condensation product from one molecule of quinizarin and two molecules of paratoluidin. In order to purify, it is filtered, washed, and dried, and the resulting dry mass is extracted by means of acetone until the acetone begins to assume a green color. When this stage is reached, the acetone is removed. The residue thus obtained represents the condensation product in a pure state. By recrystallization from glacial acetic acid it is obtained in the shape of long fine dark-blue needles with a copper-like luster, which melt on heating and yield a violet vapor when heated at higher temperatures. The pure product is insoluble in water, in diluted acids, and alkalies. As it has been found by analysis, the new product corresponds with the formula

and has most probably the following constitutional formula:

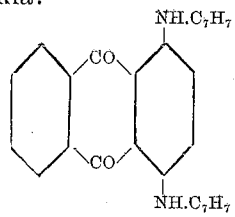

The same condensation product can also be obtained otherwise—for instance, by heating the product from quinizarin hydrid described by Liebermann, (see Liebig's *Annalen*, Vol. 212, page 14,) with paratoluidin and oxidizing the resulting leuco compound.

In order to transform it into a monosulfo-acid, I can proceed as follows: A solution prepared from ten kilos, by weight, of the said condensation product and one hundred parts of sulfuric monohydrate (containing 99.7 per cent. of $H_2SO_4$) is carefully heated at from 70° to 80° centigrade until a test portion is found to be clearly soluble in a large quantity of water. At this stage the reaction mixture is cooled and poured into fifteen hundred liters of cold water. The dyestuff is precipitated from the resulting mixture by means of common salt. It is filtered off and can be used either in a pasty state or after previous drying.

When dry and pulverized, the new coloring-matter represents a dark-green powder soluble in water with a green color, which color is not changed by the addition of alkalies or acids. If mineral acids are added in excess to the watery solution, the dyestuff is partially separated. The new dyestuff dissolves in alcohol, in acetone, in chloroform, and in benzene with a bluish-green color. By concentrated sulfuric acid it is dissolved with a blue color, which changes into violet on adding a small quantity of water and into green if a larger quantity of water is added.

If to a watery solution of the dyestuff, acidulated by means of a small quantity of acetic acid, zinc-dust is gradually added, a leuco derivative of the dyestuff is formed, which can be recognized from the fact that the color of the solution changes from green into yellow. On exposing the yellow solution when filtered to the oxidizing action of the air it soon reassumes the original green color. If, however, a small quantity of sulfuric acid is added to the said yellow solution and the latter is then heated, the dyestuff-molecule is split, quinizarin hydrid being formed which separates in the shape of fine needles.

The new coloring-matter dyes unmordanted wool in acid-baths bluish-green shades, which in an excellent manner withstand the action of light, acids, and alkalies.

Having now described my invention and in what manner the same is to be performed, what I claim as new, and desire to secure by Letters Patent, is—

1. The process for producing new anthraquinone dyestuffs being monosulfo-acids of the condensation products obtainable from one molecule of quinizarin and two molecules of a primary aromatic amin having the general formula

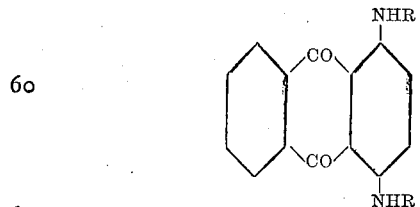

in which formula R represents an aromatic radical, such as phenyl, tolyl, xylyl, naphthyl or the like, which process consists in treating the said condensation products with agents of sulfonation, such as sulfuric monohydrate, containing 99.7 per cent. of $H_2SO_4$, until a test portion is found to be clearly soluble in a large quantity of water, introducing the reaction mixture into cold water and precipitating the formed dyestuff by means of common salt, substantially as described.

2. The process for producing a new anthraquinone dyestuff being a monosulfo-acid of the condensation product obtainable from one molecule of quinizarin and two molecules of paratoluidin and having the formula

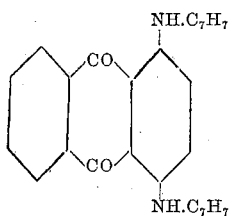

which process consists in treating the said condensation product with sulfuric monohydrate, substantially as described.

3. As new articles of manufacture the new anthraquinone dyestuffs obtainable by sulfonation of the products of condensation from one molecule of quinizarin and two molecules of a primary aromatic amin, being monosulfoacids of a body having the general formula:

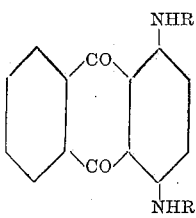

in which formula "R" represents an aromatic radical, such as phenyl, tolyl, xylyl, naphthyl or the like, representing when dry and pulverized dark powders, dissolving in water with a green color, dyeing wool in acid-baths green shades which are fast to light, to acids and to alkalies, substantially as described.

4. As a new article of manufacture the specific anthraquinone dyestuff obtainable by sulfonating the product of condensation from one molecule of quinizarin and two molecules of paratoluidin, being a monosulfo-acid of the anthraquinone compound of the formula:

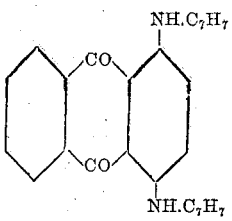

representing when dry and pulverized a dark-green powder dissolving in water with a green color, which changes into yellow on acidulating and adding zinc-dust, the filtered solution reassuming the original green color on exposure to the air and separating fine needles of quinizarin hydrid after heating with a small quantity of sulfuric acid, soluble in alcohol, acetone, chloroform and benzene with a bluish-green color, soluble in concentrated sulfuric acid with a blue color which changes into green on the addition of an excess of water, dyeing wool in acid-baths bluish-green shades which withstand the action of light, of acids and of alkalies in an excellent manner.

In testimony whereof I have signed my name in the presence of two subscribing witnesses.

ROBERT E. SCHMIDT.

Witnesses:
R. E. JAHN,
OTTO KÖNIG.